UNITED STATES PATENT OFFICE.

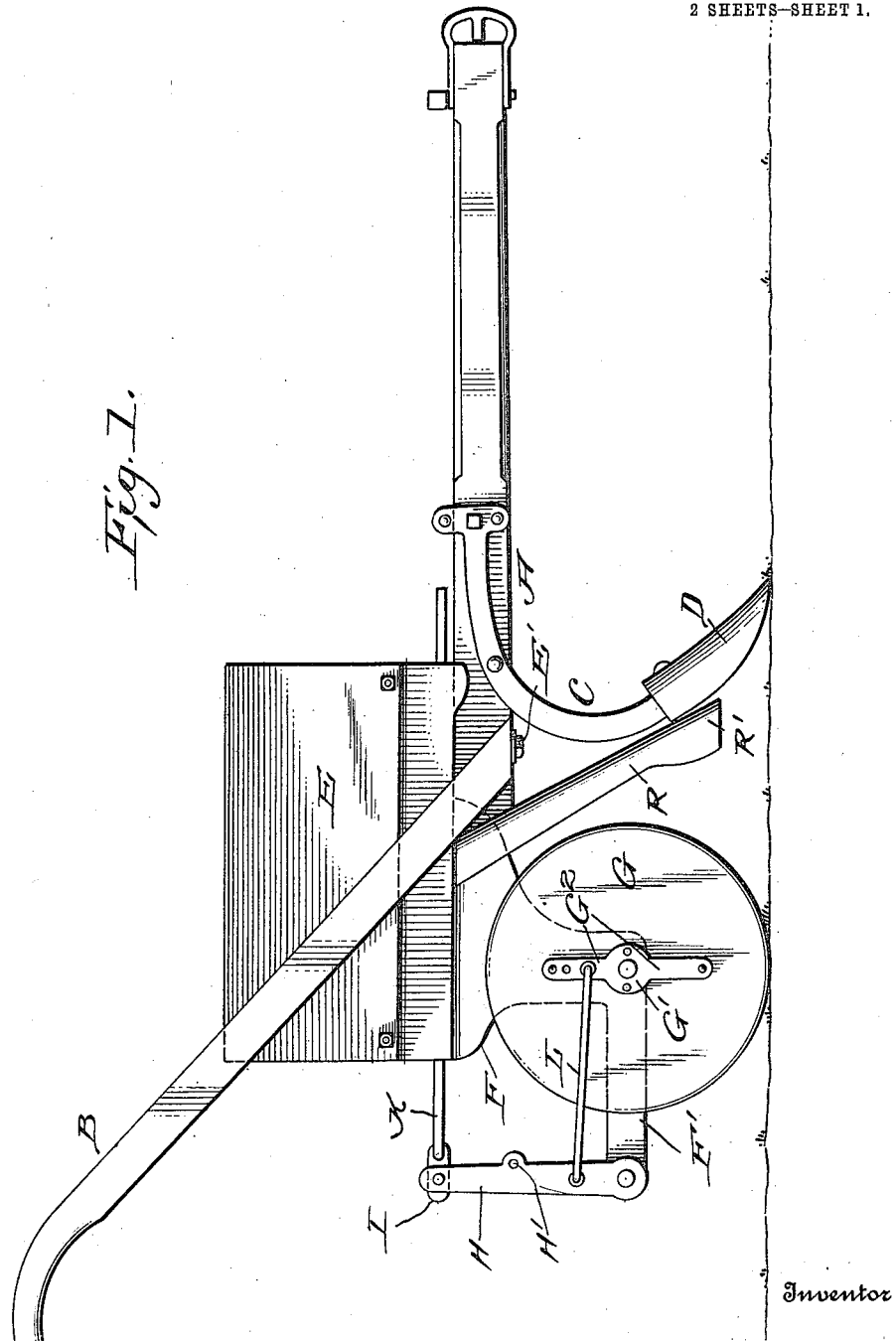

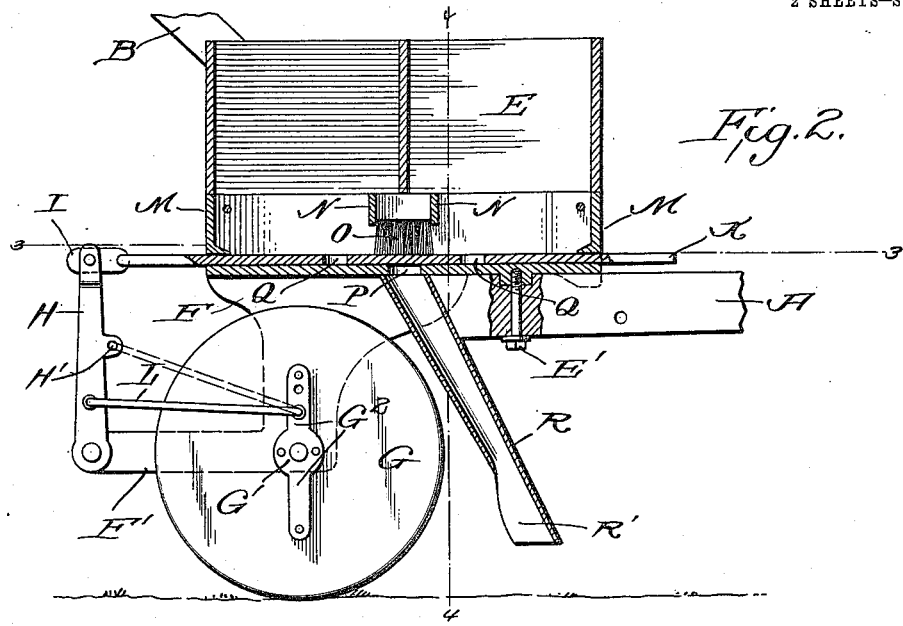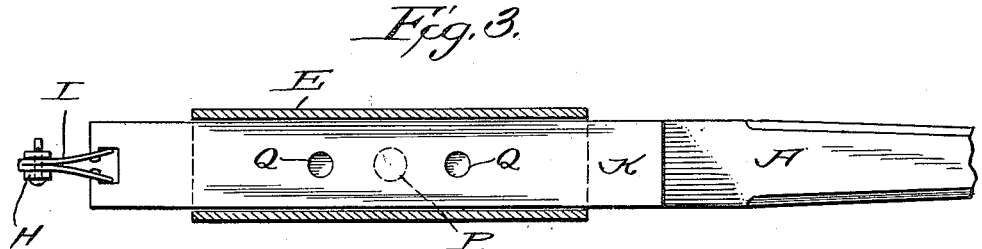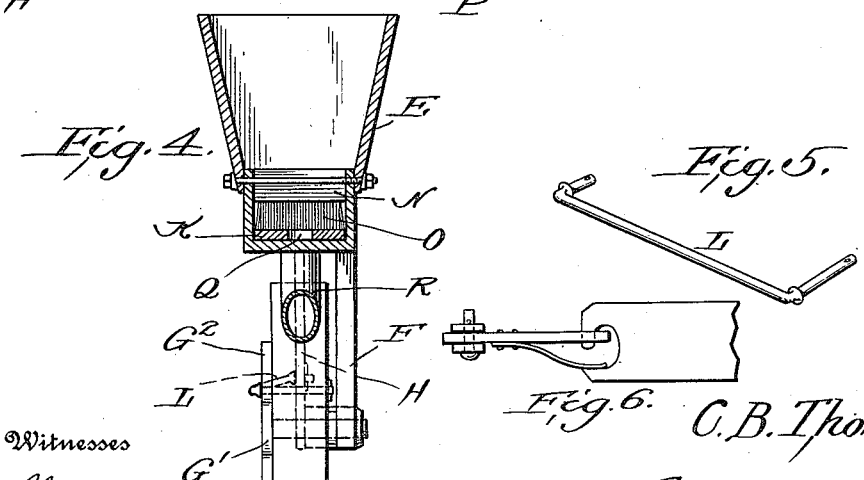

CHARLES B. THOMAS, OF WATTS, SOUTH CAROLINA.

PLANTER.

1,080,790.

Specification of Letters Patent. Patented Dec. 9, 1913.

Application filed September 10, 1912. Serial No. 719,638.

*To all whom it may concern:*

Be it known that I, CHARLES B. THOMAS, a citizen of the United States, residing at Watts, in the county of Abbeville and State of South Carolina, have invented a new and useful Improvement in Planters, of which the following is a specification.

This invention relates generally to planters, and more particularly to a corn planter, and the object of the invention is to provide an exceedingly cheap, simple, and efficient construction of planter which will accurately drop the corn or other grain being planted; and a still further object of the invention is to provide a planter in which four hills can be planted at one turn of the wheel or two hills can be planted at each turn of the wheel as preferred.

With these and certain other objects in view, which will appear hereinafter my invention consists of the novel features of construction, combination and arrangement all of which will be fully described and pointed out in the claims.

In the drawings forming a part of this specification; Figure 1 is a side elevation of a planter constructed in accordance with my invention. Fig. 2 is a vertical section through the hopper box and discharge spout. Fig. 3 is a sectional plan view taken through the box and showing the slide on the line 3—3 of Fig. 2. Fig. 4 is a sectional view on the line 4—4 of Fig. 2. Fig. 5 is a perspective view of a pitman rod. Fig. 6 is a modified form of link.

In carrying out my invention, I employ the ordinary construction of plow beam A to which are secured in the usual manner the handles B. The adjustable standard C connected to the plow beam is of the usual or any approved construction and has the opening shovel or plow D detachably connected thereto.

Upon the rear end of the plow beam and between the handles is a cast metal box E, said box being attached to the plow beam by means of a bolt E' passed through the bottom of the box and through the plow beam and secured by means of a nut from the underside of said beam. The box is preferably constructed with short depending side flanges which fit the sides of the plow beam and thereby enable one bolt to hold the box securely in position upon the plow beam. This cast metal box projects rearwardly beyond the end of the plow beam and at one side is formed with an integral depending hanger bracket F in which is journaled the operating wheel G, and the rear end of this hanger bracket F is constructed with a lateral extension F' to which is pivoted a lever H which in turn is connected at its upper end to a rod or link I, which is pivotally connected to the dropping slide K hereinafter more fully described.

The wheel G may be of any suitable material and is provided with a bushing G' having radial extensions $G^2$, said radial extensions being apertured to receive the hooked end of a pitman rod L, the opposite end of said pitman rod being pivotally connected to the lever H which operates the slide. This lever H may have a plurality of apertures H' so that the position of the pitman can be adjusted so as to throw the slide a longer or shorter distance as desired. By means of the lateral extension upon the depending hanger bracket the lever and pitman are brought into proper alinement with the wheel and the easy operation of the device thereby facilitated.

The cast metal box E is made with integral end pieces M, which extend nearly to the bottom of the box and intermediate the ends the box is preferably constructed with two integral cross pieces N between which is arranged the brush O, said brush resting directly over the discharge opening P produced in the bottom of the box. The slide has two openings Q produced therein and by making the box as herein shown and described it will of course be understood that as the planter is drawn along the ground, the furrow will be opened by the plow D and the wheel traveling upon the ground will cause the slide to reciprocate back and forth in the box collecting a definite number of grains in each slide opening and carrying the same to the discharge opening in the box, the centrally located brush sweeping off the surplus grains. The grain as it passes through the discharge opening enters a galvanized delivery tube R which is attached to the box and extends downwardly in an inclined position beneath the plow standard and at its rear end this delivery tube or chute is split so that the forward lower end thereof can be spread slightly as shown at R', the purpose being to prevent any weeds, roots or other substances choking the forward end of the delivery tube or chute. The cast metal box may be of any desired size but in practice will probably be made about one foot long and three inches high and to this cast metal box is attached any suitable manner a wooden hopper, not shown, this being sufficient to hold the desired amount of grain. The box is sub-divided transversely if so desired in order to discharge two different kinds of grain alternately.

The main feature of my invention is the simplicity of the working parts and the cheapness of construction, and furthermore by the simple adjustment of the pitman on the wheel, the length of the stroke can be regulated so as to drop either two hills of corn or four hills of corn at each turn of the wheel.

In practice I prefer to connect the slide and rocking lever by means of a spring link L bent centrally upon itself and having apertures at its ends adapted to engage the internal lugged slot K' at the end of the slide as by means of this device different character of slides can be quickly and easily detached and substituted whenever desired.

In Fig. 6 I have shown a modified form of link comprising the ratchet bar I' which engages a lug upon one side the slot K' of the slide K, and to which is connected the spring member I² which engages the opposite side of the slot K'.

If desired a number of holes can be placed in the slide close together and the device can then be applied as a drill instead of a planter.

The box E is divided by means of a transverse partition E² as shown and by placing different kinds of grain in the different compartments the planter can be made to deposit the different grains in alternate hills.

What I claim is:

1. A planter of the kind described comprising a plow stock, of a box mounted thereon, said box having an opening in the bottom thereof, brush holding means arranged centrally of the box, a brush arranged therein, a reciprocating slide arranged in the box and working through the ends thereof, said slide having a plurality of feed openings arranged therein, a depending hanger bracket integral with the box, an operating wheel journaled in said hanger, a lever also connected to said hanger, a pitman connecting said operating wheel and lever and a detachable link connecting the lever and slide together with the furrow opener and delivery chute as set forth.

2. In a planter of the kind described comprising a plow stock, a box bolted thereon and having positioning flanges at the forward end thereof, an integral depending hanger bracket extending downwardly from the rear portion of said box, a slide working in said box, a brush arranged in the box and means for holding said brush in position, an operating wheel journaled in the depending bracket and a lever pivotally connected to the rear end of said bracket, a pitman adjustably connecting the operating wheel and lever and a detachable link connecting said lever and slide.

3. In a device of the kind described, the combination with a slide operating in a box, having a plurality of openings, an operating wheel, a pitman connected thereto, a lever operated by said pitman, said lever having an adjustable connection with reference to said pitman, whereby a long or short stroke can be obtained, and a link connecting said lever and slide, as set forth.

4. In a planter of the kind described, the combination with a box having a central opening and a brush positioned above the same, a slide working in the bottom of said box and having a plurality of openings, said openings being so positioned as to drop twice upon one turn of the wheel upon the short stroke of the operating wheel and four hills to each revolution of the wheel upon the long stroke of said slide, in combination with a lever and link connecting the same with the slide, an operating wheel and the adjustable pitman connecting said wheel and lever whereby a long or short stroke may be obtained for the purpose set forth.

5. In a device of the kind described, the combination with a slide, an operating lever, of the detachable spring link having openings in its ends, its forward end being adapted to engage the lugged slot in the rear end slide, as set forth.

CHARLES B. THOMAS.

Witnesses:
BESSIE I. BISHOP,
E. B. McBATH.

---

Copies of this patent may be obtained for five cents each, by addressing the "Commissioner of Patents, Washington, D. C."